(12) United States Patent
Liu et al.

(10) Patent No.: US 10,518,881 B2
(45) Date of Patent: Dec. 31, 2019

(54) UAV, METHOD AND SYSTEM FOR CLEANING A WALL BODY

(71) Applicant: SZ DJI TECHNOLOGY CO., LTD., Shenzhen (CN)

(72) Inventors: Ang Liu, Shenzhen (CN); Yuwei Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 57 days.

(21) Appl. No.: 15/439,081

(22) Filed: Feb. 22, 2017

(65) Prior Publication Data
US 2017/0158329 A1 Jun. 8, 2017

Related U.S. Application Data

(63) Continuation of application No. PCT/CN2014/085832, filed on Sep. 3, 2014.

(51) Int. Cl.
*B08B 1/00* (2006.01)
*B08B 1/04* (2006.01)
(Continued)

(52) U.S. Cl.
CPC .............. *B64C 39/024* (2013.01); *A47L 1/02* (2013.01); *A47L 11/38* (2013.01); *A47L 11/4011* (2013.01); *B08B 1/001* (2013.01); *B08B 1/008* (2013.01); *B08B 1/04* (2013.01); *B08B 3/024* (2013.01); *B08B 3/08* (2013.01); *B08B 7/028* (2013.01); *E04G 23/002* (2013.01); *A47L 2201/02* (2013.01); *A47L 2201/04* (2013.01); *B08B 2203/02* (2013.01); *B64C 2201/024* (2013.01); *B64C 2201/027* (2013.01); *B64C 2201/108* (2013.01); *B64C 2201/12* (2013.01); *B64C 2201/141* (2013.01)

(58) Field of Classification Search
CPC ......... B08B 3/02; B08B 1/008; B64C 39/024; B64C 2201/12; B64C 2201/141; A47L 1/02; A47L 11/4011; E04G 23/002
See application file for complete search history.

(56) References Cited

U.S. PATENT DOCUMENTS 7,526,100 B1 * 4/2009 Hartman .............. G06K 9/3241
382/103
2009/0100618 A1 4/2009 Chen
(Continued)

FOREIGN PATENT DOCUMENTS

CN 201002085 Y 1/2008
CN 101756678 A 6/2010
(Continued)

OTHER PUBLICATIONS

The World Intellectual Property Organization (WIPO) International Search Report for PCT/CN2014/085832 dated May 28, 2015 8 Pages.

*Primary Examiner* — Mikhail Kornakov
*Assistant Examiner* — Natasha N Campbell
(74) *Attorney, Agent, or Firm* — Anova Law Group, PLLC

(57) ABSTRACT

A method for cleaning a wall body with a UAV includes obtaining a path to be cleaned; flying to a region to be cleaned according to the path to be cleaned; recognizing a wall surface in the region to be cleaned; and using a cleaning device carried by the UAV to clean the wall surface.

20 Claims, 18 Drawing Sheets

(51) Int. Cl.
*B08B 3/02* (2006.01)
*B08B 3/08* (2006.01)
*B08B 7/02* (2006.01)
*A47L 11/38* (2006.01)
*A47L 11/40* (2006.01)
*B64C 39/02* (2006.01)
*E04G 23/00* (2006.01)
*A47L 1/02* (2006.01)

(56) References Cited

U.S. PATENT DOCUMENTS

| | | | |
|---|---|---|---|
| 2011/0131741 A1* | 6/2011 | Jones | A47L 5/30 15/21.1 |
| 2011/0214248 A1 | 9/2011 | McLeod et al. | |
| 2013/0231819 A1 | 9/2013 | Hung et al. | |
| 2016/0052026 A1* | 2/2016 | Chin | E04G 23/002 15/319 |

FOREIGN PATENT DOCUMENTS

| | | |
|---|---|---|
| CN | 101913427 A | 12/2010 |
| CN | 202313139 U | 7/2012 |
| CN | 102768341 A | 11/2012 |
| CN | 102789231 A | 11/2012 |
| CN | 102835935 A | 12/2012 |
| CN | 102846273 A | 1/2013 |
| CN | 102846275 A | 1/2013 |
| CN | 202699027 U | 1/2013 |
| CN | 202840553 U | 3/2013 |
| CN | 202879789 U | 4/2013 |
| CN | 103099583 A | 5/2013 |
| CN | 203122289 U | 8/2013 |
| CN | 103690110 A | 4/2014 |
| CN | 103845004 A | 6/2014 |
| CN | 103845005 A | 6/2014 |
| CN | 203620847 | 6/2014 |
| CN | 104224062 A | 12/2014 |
| EP | 0401120 A1 | 12/1990 |
| JP | H08256953 A | 10/1996 |
| JP | H0994197 A | 4/1997 |
| JP | H1066663 A | 3/1998 |
| JP | 2010017428 A | 1/2010 |

* cited by examiner

UAV, METHOD AND SYSTEM FOR CLEANING A WALL BODY

CROSS-REFERENCE TO RELATED APPLICATION

This is a continuation application of International Application No. PCT/CN2014/085832, filed on Sep. 3, 2014, the entire contents of which are incorporated herein by reference.

TECHNICAL FIELD

The present disclosure generally relates to UAV (Unmanned Aerial Vehicle), and particularly, to UAVs capable of cleaning a wall body, methods for cleaning a wall body with a UAV, and a wall body cleaning system using a UAV.

BACKGROUND

Outer walls of high-rise buildings in cities are exposed to wind, rain and sun all year round, and dust in the air will attach to the surface thereof. For the overall image of the city, a new industry has sprung up in the modern metropolises, a cleaning industry for outer walls of high-rise buildings. In general, personnel engaged in such an industry are workers professionally trained for at height operations, who perform detergent spraying and dust and dirt washing work on outer wall surfaces of buildings, moving up and down using a safety rope.

Since the workers operating at height use the safety rope to do the outer wall cleaning work, there is a great risk of danger. In order to reduce the risk, robots for cleaning a wall body have appeared recently; however, it is difficult to solve the problem of how to attach the wall body cleaning robot to the wall body. Although the principle of vacuum adhesion can be used for common glass outer walls, the difficulties in release and movement remain, and there is virtually no solution for ordinary wall bodies.

SUMMARY

In view of this, the present disclosure provides methods for cleaning a wall body by a UAV, which can greatly reduce the risk of danger in cleaning the wall body of a building without the need of attachment to the wall surface of the building, thus enables more flexible movement, and is applicable to different types of wall bodies.

A method for cleaning a wall body by a UAV, comprising the steps of:

step a, obtaining a path to be cleaned;

step b, flying to a region to be cleaned according to said path to be cleaned;

step c, recognizing a wall surface of said region to be cleaned; and step d, using a cleaning device carried by a UAV to clean said wall surface.

Compared to traditional wall body cleaning methods, the above-mentioned method for cleaning a wall body by a UAV has at least the following advantages:

(1) In the above-mentioned method, a cleaning device carried by the UAV is used to clean the wall surface, and thus there is no need for workers to operate at height, thereby greatly reducing the risk of danger in cleaning the wall body of a building.

(2) The UAV can freely hover in the air without the need of attachment to the wall surface of the building, which realizes more flexible movement, and is applicable to different types of wall bodies.

(3) The UAV can automatically search for a region to be cleaned according to a path to be cleaned and recognize the wall surface in the cleaning region, thereby greatly improving automation in cleaning the building wall surface.

In one embodiment, said step a further comprises:

step a1, obtaining a total cleaning path and a cleaned path; and step a2, planning the path to be cleaned according to said total cleaning path and said cleaned path.

In one embodiment, said total cleaning path is obtained by a positioning sensor mounted on said UAV;

and/or said total cleaning path is obtained by a global positioning system provided on a building.

In one embodiment, said total cleaning path comprises at least one of a path along a wall body of a building in a vertical direction, or a path along the wall body of the building in a horizontal direction.

In one embodiment, said path along a wall body of a building in a vertical direction is a vertical path in a downward direction of the wall body of said building.

In one embodiment, said step b further comprises:

step b1, determining whether there is a cleaning prohibition identifier;

step b2, if there is a cleaning prohibition identifier, recognizing the current region as a cleaning prohibition region; and step b3, if there is no cleaning prohibition identifier, recognizing the current region as said region to be cleaned.

In one embodiment, said cleaning prohibition identifier comprises at least one of a pattern provided on said wall surface, or a cleaning prohibition signal sent by a signal generator provided on said wall surface.

In one embodiment, said pattern comprises a prohibition starting pattern and a prohibition ending pattern, which are located at two opposite edges of the cleaning prohibition region.

In one embodiment, there is a plurality of said signal generators, and said signal generators comprise a starting signal generator and an ending signal generator which are located at two opposite edges of the cleaning prohibition region.

In one embodiment, there is a plurality of said signal generators, said plurality of signal generators is provided in the middle of the cleaning prohibition region, and signals generated by said plurality of signal generators cover said cleaning prohibition region.

In one embodiment, said step c further comprises a step of measuring the distance between said wall surface and said UAV, and/or a step of recognizing the type of said wall surface.

In one embodiment, the type of said wall surface comprises at least one of a glass wall surface or an ordinary wall surface; and said ordinary wall surface comprises at least one of a wall surface with distinguishable textures, a wall surface with a repeated texture or a wall surface without texture.

In one embodiment, the distance between said wall surface and said UAV is obtained by a wall surface distance sensor of said UAV.

In one embodiment, said wall surface distance sensor comprises at least one of an ultrasonic distance sensor, a visual distance sensor, a laser distance sensor, an infrared distance sensor, or a radar distance sensor.

In one embodiment, the type of said wall surface is obtained by a wall surface type sensor of said UAV.

In one embodiment, said wall surface sensing sensor comprises at least one of an ultrasonic sensor, a laser sensor, or a visual sensor.

In one embodiment, said step d further comprises:

step d1, obtaining the type of said wall surface;

step d2, selecting a cleaning mode corresponding to the type of said wall surface according to the type of said wall surface;

step d3, controlling the distance between said UAV and said wall surface according to said selected cleaning mode; and step d4, using said selected cleaning mode to clean said wall surface.

In one embodiment, said cleaning mode comprises at least one of ultrasonic oscillation cleaning or detergent spraying cleaning.

In one embodiment, said detergent spraying cleaning mode comprises at least one of wiping by sliding back and forth, wiping by rotating, or wiping by one-way dragging.

In one embodiment, said method further comprises step e: stopping the cleaning of said wall surface, and automatically returning to a landing point along a return path.

In one embodiment, said step e further comprises the steps of:

step e1, determining whether the amount of currently remaining energy of said UAV is greater than the amount of energy required to return from the current position; and step e2, if the amount of currently remaining energy of said UAV is not greater than the amount of energy required to return from the current position, immediately stopping the cleaning of said wall surface, and automatically returning along said return path.

In one embodiment, said step e further comprises the steps of:

step e3, if the amount of currently remaining energy of said UAV is greater than the amount of energy required to return from the current position, determining whether said cleaning device is able to continue working; and step e4, if said cleaning device is unable to continue working, immediately stopping the cleaning of said wall surface, and automatically returning along said return path.

In one embodiment, said step e further comprises the steps of:

step e5, if said cleaning device is able to continue working, determining whether said path to be cleaned is finished;

step e6, if said path to be cleaned is finished, immediately stopping the cleaning of said wall surface, and automatically returning along said return path; and step e7, if said path to be cleaned is not finished, the UAV following said path to be cleaned and continuing cleaning.

In one embodiment, said UAV stops the cleaning of said wall surface upon receiving at least one of information indicating that the currently remaining energy of said UAV is insufficient for returning, information indicating that said cleaning device is unable to continue working, or information indicating that said path to be cleaned has been finished by said UAV.

In one embodiment, the information indicating that said cleaning device is unable to continue working comprises at least one of information indicating that the energy of said cleaning device is insufficient or information indicating that the cleaning raw material of said cleaning device is insufficient.

In one embodiment, the energy source of both said cleaning device and said UAV is electrical energy, and both of them share one power supply.

In one embodiment, the cleaning raw material of said cleaning device is a detergent or water.

In one embodiment, the energy source of said UAV is electrical energy or a fuel oil.

In one embodiment, said landing point is a base station.

In one embodiment, said method further comprises a step f after said step e: replenishing said UAV with energy and/or a cleaning raw material by said base station.

In one embodiment, said wall surface is an outer wall of a building, and said base station is provided in the air or on the top of said building;

or said wall surface is an inner wall of a building, and said base station is provided on an indoor floor of said building.

In one embodiment, said return path is a path pre-set by a user, a cleaned path, or an automatically planned path.

In one embodiment, said automatically planned path comprises at least one of a path with the minimal energy consumption, a path with the shortest return travel, or a path with the shortest return time.

In one embodiment, said step d further comprises a step of cleaning said wall surface by means of ultrasonic vibration.

In one embodiment, the area of said wall surface subjected to ultrasonic vibration is adjusted by the distance between said cleaning device and said wall surface;

or the area of said wall surface subjected to ultrasonic vibration is adjusted by said cleaning device itself.

In one embodiment, said step d further comprises a step of recording a cleaned path while cleaning said wall surface.

In one embodiment, said step d further comprises a step of cleaning said wall surface by means of detergent spraying cleaning.

In one embodiment, the area of said wall surface subjected to detergent spraying is adjusted by the distance between said cleaning device and said wall surface;

or the area of said wall surface subjected to detergent spraying is adjusted by said cleaning device itself.

In one embodiment, said landing point is a site pre-set by a user, or a site automatically set by said UAV.

A UAV for cleaning a wall body, comprising:

a memory for storing a path to be cleaned;

a positioning sensor for obtaining information about the current position of the UAV;

a wall surface recognition sensor for obtaining information about a wall surface; and a controller communicatively connected to said memory, said positioning sensor and said wall surface recognition sensor, for obtaining said path to be cleaned, said information about a wall surface, and said information about the current position;

wherein said controller sends a flying control signal for flying to a region to be cleaned according to said path to be cleaned and said information about the current position; and said controller sends a cleaning control signal for cleaning said wall surface according to said information about a wall surface.

The above-mentioned UAV has at least the following advantages:

(1) The cleaning device carried by the UAV is able to clean the wall surface, and thus there is no need for workers to operate at height, thereby greatly reducing the risk of danger in cleaning the wall body of a building.

(2) The UAV can freely hover in the air without the need of attachment to the wall surface of the building, which realizes more flexible movement, and is applicable to different types of wall bodies.

(3) The UAV can automatically search for a region to be cleaned according to its own positioning sensor and a path to be cleaned stored in the memory, and recognize the wall surface in the cleaning region according to its own wall surface recognition sensor, thereby greatly improving automation in cleaning the building wall surface.

In one embodiment, said positioning sensor comprises at least one of a GPS, an IMU, or a height sensor;

and said height sensor comprises at least one of a barometric altimeter, an infrared distance sensor, an ultrasonic distance sensor, a visual distance sensor, a laser distance sensor, or a radar distance sensor.

In one embodiment, said wall surface recognition sensor comprises a wall surface distance sensor for measuring the distance between said UAV and said wall surface.

In one embodiment, said wall surface distance sensor comprises at least one of an ultrasonic distance sensor, a visual distance sensor, a laser distance sensor, an infrared distance sensor, or a radar distance sensor.

In one embodiment, said wall surface recognition sensor comprises a wall surface type sensor for recognizing the type of said wall surface.

In one embodiment, said wall surface type sensor comprises at least one of an ultrasonic sensor, a laser sensor, or a visual sensor.

In one embodiment, the type of said wall surface comprises at least one of a glass wall surface or an ordinary wall surface; and said ordinary wall surface comprises at least one of a wall surface with distinguishable textures, a wall surface with a repeated texture or a wall surface without texture.

In one embodiment, said wall surface type sensor comprises a prohibition identifier recognition sensor for recognizing a washing prohibition identifier on said wall surface.

In one embodiment, said prohibition identifier recognition sensor comprises at least one of a signal receiver, or a visual sensor.

In one embodiment, said memory further stores a total cleaning path and a cleaned path, and said controller obtains said path to be cleaned according to said total cleaning path and cleaned path.

In one embodiment, said total cleaning path is obtained by said positioning sensor;

and/or said total cleaning path is obtained by a global positioning system provided on a building.

In one embodiment, said total cleaning path comprises at least one of a path along a wall body of a building in a vertical direction, or a path along the wall body of the building in a horizontal direction.

In one embodiment, said path along a wall body of a building in a vertical direction is a vertical path in a downward direction of the wall body of said building.

In one embodiment, said memory is further used for storing a return path, and said controller controls said UAV to return to a landing point according to said return path.

In one embodiment, said return path is a path pre-set by a user, a cleaned path, or an automatically planned path.

In one embodiment, said automatically planned path comprises at least one of a path with the minimal energy consumption, a path with the shortest return travel, or a path with the shortest return time.

In one embodiment, said UAV further comprises a cleaning device for cleaning said wall surface.

In one embodiment, said cleaning device comprises at least one of a spraying mechanism for spraying a detergent, an ultrasonic transducer for generating ultrasonic oscillation, a rotation-driving mechanism for driving a cleaning component to rotate, a sliding-driving mechanism for driving said cleaning component to slide back and forth, or a dragging mechanism for dragging said cleaning component.

In one embodiment, the area of said wall surface subjected to ultrasonic oscillation is adjusted by the distance between said ultrasonic transducer and said wall surface;

or the area of said wall surface subjected to ultrasonic oscillation is adjusted by said ultrasonic transducer.

In one embodiment, the area of said wall surface subjected to detergent spraying is adjusted by the distance between said spraying mechanism and said wall surface;

or the area of said wall surface subjected to detergent spraying is adjusted by said spraying mechanism.

In one embodiment, said cleaning component comprises at least one of a cleaning cloth or a cleaning sponge.

In one embodiment, said UAV further comprises a gimbal platform, said cleaning device is connected to a body of said UAV via said gimbal platform, and the attitude of said cleaning device is adjusted by said gimbal platform.

A wall body cleaning system, comprising:
an UAV as described above, and
a base station for replenishing said UAV with energy and/or a cleaning raw material.

In one embodiment, the energy source of said UAV is electrical energy, and said base station comprises a battery replacement device for replacing a battery of said UAV and a battery charging device for charging the battery of said UAV.

In one embodiment, the energy source of said UAV is a fuel oil, and said base station comprises a fuel oil replenishment device for replenishing said UAV with fuel oil.

In one embodiment, said base station comprises a cleaning raw material replenishment device for replenishing said UAV with said cleaning raw material.

In one embodiment, said wall surface is an outer wall of a building, and said base station is provided in the air or on the top of said building;

or said wall surface is an inner wall of a building, and said base station is provided on an indoor floor of said building.

In one embodiment, there is a plurality of said UAVs, and said base station is able to simultaneously or sequentially replenish said plurality of UAVs with energy and the cleaning raw material;

or there is a plurality of said base stations, and said UAV is able to automatically select one of said plurality of base stations for the replenishment of energy and the cleaning raw material.

In one embodiment, said base station further comprises a master controller for controlling said UAV and a wireless signal transmitter for transmitting a control signal, and said UAV further comprises a wireless signal receiver.

DETAILED DESCRIPTION OF THE EMBODIMENTS

Figure 1:
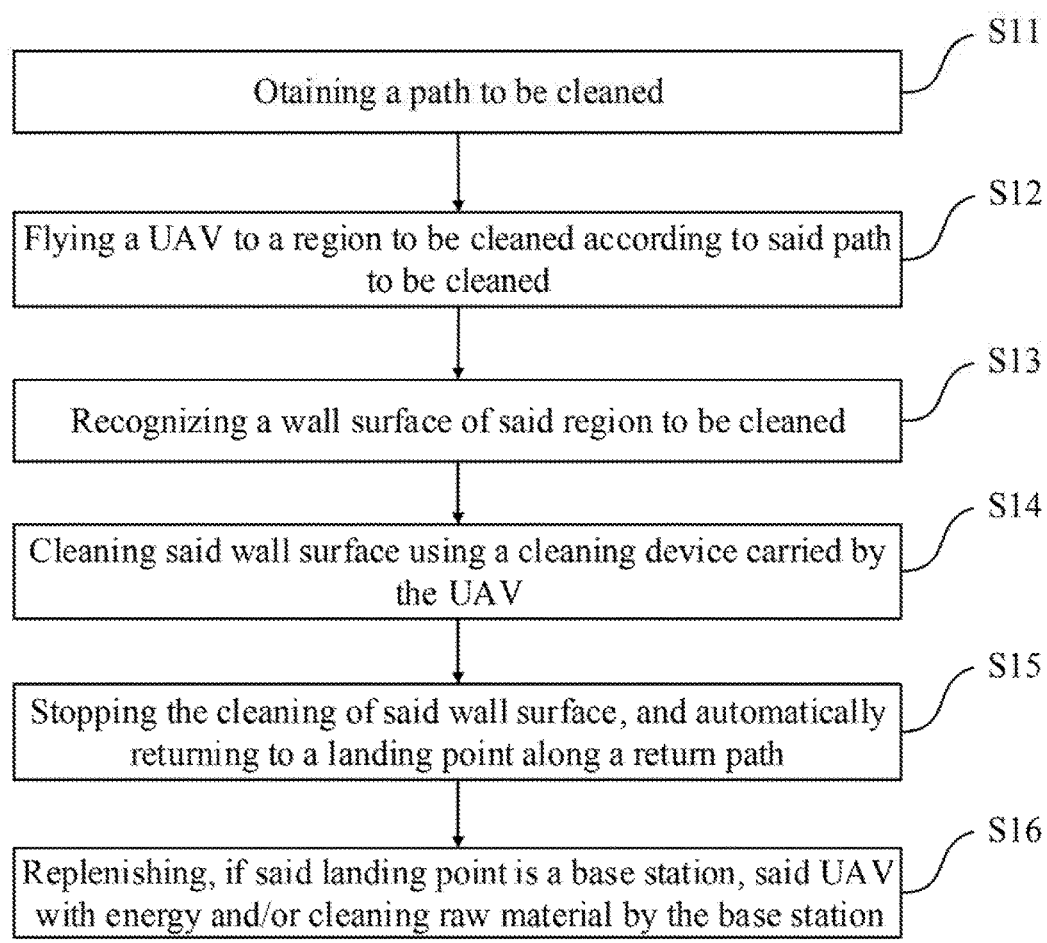
FIG. 1 is a flowchart of a method for cleaning a wall body by a UAV according to an embodiment of the present disclosure.

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

It should be noted that, when a component is descried as "fixed to" another component, it can be directly on another component, or an intermediate component can be present. When a component is considered to be "connected" to another component, it can be directly connected to another component or an intermediate component can be present at the same time. The terms "vertical", "horizontal", "left", "right" and similar expressions used herein are intended for the purposes of illustration only.

Unless otherwise defined, all technical and scientific terms used herein have the same meaning as commonly understood by one of ordinary skill in the art to which this present disclosure belongs. The terms used in the description of the present disclosure are for the purpose of describing particular embodiments and are not intended to limit the present disclosure. The term "and/or" used herein includes any and all combinations of one or more of the associated listed items.

In an embodiment of the present disclosure, disclosed is a method for cleaning a wall body by a UAV, in which a cleaning device carried by the UAV is used to clean a wall surface of a building, and then the UAV is replenished by a base station.

In some embodiments, the cleaning device may be integrated into a body of the UAV, and may also be separately manufactured and then assembled together with the UAV.

In some embodiments, said wall surface may be an outer wall surface of the building, and may also be an inner wall surface of the building, for example, for some tower type buildings, the height of the inner chamber thereof is relatively high, and the above-mentioned method can likewise be used for cleaning the inner wall surface of the buildings.

In some embodiments, said base station may be provided on the roof of the building, for example, when the outer wall surface of the building is cleaned, the base station may be provided on the roof of the building, or hover in the air, so as to facilitate cleaning downward from the roof by said UAV.

Said base station may also be provided on an indoor floor of the building, for example, for cleaning the inner wall surface of some tower type buildings, the base station may be provided on an indoor floor of the buildings.

In some embodiments, said UAV flies to a region to be cleaned according to a path to be cleaned, and cleans a wall surface of the region to be cleaned.

Said path to be cleaned may be planned in real time, and may also be pre-set. Said path to be cleaned may be calculated according to a total cleaning path and a recorded cleaned path.

In some embodiments, the total cleaning path of said UAV may be used for cleaning the building floor by floor in a vertical direction, for example, the total cleaning path of said UAV is a plurality of parallel vertical paths in a downward direction of the building, which are arranged spaced apart from each other. The total cleaning path of said UAV may also be used for cleaning floor by floor in a horizontal direction of the wall body of the building, for example, the total cleaning path of said UAV is a plurality of parallel horizontal paths from left to right of the building, which are arranged spaced apart from each other.

In some embodiments, the cleaning mode of said UAV may be a detergent spraying cleaning mode, and may also be an ultrasonic oscillation cleaning mode.

In some embodiments, the area cleaned at a time by the cleaning device carried by said UAV can be adjusted by the distance between said cleaning device and said wall surface or by said cleaning device itself.

In some embodiments, said detergent spraying cleaning mode may be various types, for example, wiping by sliding back and forth, wiping by rotating, and wiping by one-way dragging. The term "wiping by sliding back and forth" refers to driving a cleaning component to wipe the wall surface back and forth, for example, wiping the wall surface back and forth in the up and down direction or in the left and right direction. The term "wiping by rotating" refers to driving a cleaning component to rotate, so as to make the cleaning component wipe the wall surface. The term "wiping by one-way dragging" refers to dragging a cleaning component on the wall surface to wipe the wall surface, for example, dragging along said wall surface downwardly, or dragging along said wall surface upwardly.

In some embodiments, said wall surface is provided with a cleaning prohibition identifier for identifying the regions on said wall surface which do not need to be cleaned, and said UAV will immediately fly to other regions which need to be cleaned after sensing said cleaning prohibition identifier.

Said cleaning prohibition identifier may be a physical identifier adhered to said wall surface, for example, said cleaning prohibition identifier is a pattern provided on said wall surface. Said cleaning prohibition identifier may also be a virtual identifier covering said wall surface, for example, said cleaning prohibition identifier is a cleaning prohibition signal sent by a signal generator provided on said wall surface.

In some embodiments, the type of said wall surface may be of various types, for example, a glass wall surface and an ordinary wall surface. Said ordinary wall surface may be a wall surface with distinguishable textures, a wall surface with a repeated texture, or a wall surface without texture and the like.

In some embodiments, said UAV automatically returns to a landing point along a return path after finishing the cleaning operation. The landing point may be a site pre-set by a user, for example, the landing point may be a default position set by the user in advance, such as a base station, or may be a position temporarily set by the user according to the current environment.

Said landing point may also be a site automatically set by said UAV. For example, said landing point may be a landing position automatically selected by said UAV according to the current environment.

Based on the above-mentioned methods for cleaning a wall body by a UAV, an embodiment of the present disclosure further provides a UAV capable of implementing the above-mentioned methods. Said UAV embodiment comprises a memory for storing a path to be cleaned and a return path, a positioning sensor for obtaining information about the current position of the UAV, a wall surface recognition sensor for obtaining information about a wall surface; and a controller for controlling the flying path of said UAV and the working state of said cleaning device.

In some embodiments, the cleaning device is carried by said UAV via a gimbal platform. The attitude of said cleaning device can be adjusted by said gimbal platform.

In some embodiments, said UAV directly carries said cleaning device, and the attitude of said cleaning device is adjusted by the attitude of said UAV.

In some embodiments, said cleaning device comprises at least one of a spraying mechanism for spraying a detergent, an ultrasonic transducer for generating ultrasonic oscillation, a rotation-driving mechanism for driving a cleaning component to rotate, a sliding-driving mechanism for driving said cleaning component to slide back and forth, or a dragging mechanism for dragging said cleaning component.

In some embodiments, said wall surface recognition sensor comprises at least one of a wall surface distance sensor, a wall surface type sensor, or a prohibition identifier recognition sensor. Said wall surface distance sensor is used for sensing the distance between said UAV and said wall surface. In one embodiment, said wall surface type sensor is used for recognizing the type of said wall surface. Said prohibition identifier recognition sensor is used for recognizing a washing prohibition identifier on said wall surface.

Based on the above-mentioned UAV, an embodiment of the present disclosure further provides a wall body cleaning system. Said wall body cleaning system comprises a UAV as described above and a base station which is used for replenishing said UAV with energy and/or a cleaning raw material.

In some embodiments, the base station may be provided outside a building, for example, said wall surface is an outer wall surface of the building, and said base station is provided in the air or on the top of said building; The base station may be provided inside a building, for example, said wall surface is an inner wall surface of the building, and said base station is provided on an indoor floor of said building.

In some embodiments, one base station may simultaneously or sequentially replenish said plurality of UAVs with energy and the cleaning raw material. In the case that there is a plurality of said base stations, one UAV is able to automatically select one of said plurality of base stations for the replenishment of energy and the cleaning raw material.

In some embodiments, energy sources of said UAV and the cleaning device may share one energy source device, and may also respectively use different energy sources.

Some of the embodiments of the present disclosure are described in detail below with reference to the drawings.

With reference to FIG. 1, a method for cleaning a wall body by a UAV according to an embodiment of the present disclosure comprises steps S11-S15 as follows.

Step 11 is obtaining a path to be cleaned.

Figure 2:
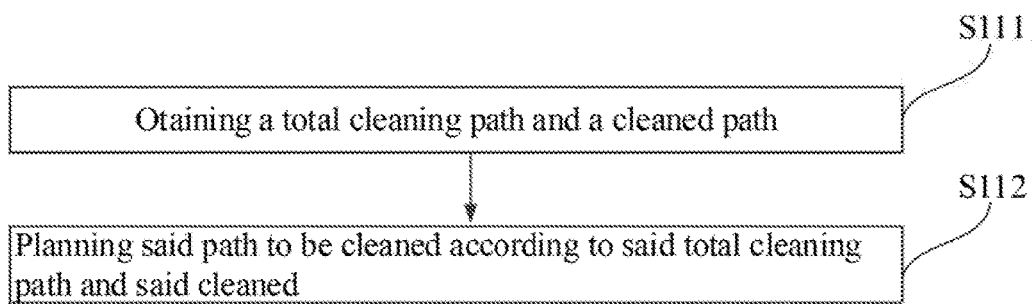
FIG. 2 is a specific flowchart of step 1 of the method for cleaning a wall body by a UAV as shown in FIG. 1.

Said step S11 can be performed in different ways, for example, as shown in FIG. 2, specifically in this embodiment, step S11 further comprises steps S111 and S112.

Step 111 is obtaining a total cleaning path and a cleaned path.

The total cleaning path can be obtained in different ways; in one embodiment, the total cleaning path can be obtained by a positioning sensor mounted on the UAV, for example, before planning the total cleaning path, the UAV flies around the regions to be cleaned of the building, and obtains positional information about all the regions to be cleaned by the positioning sensor mounted on the UAV, so as to obtain the total cleaning path.

Figure 3:
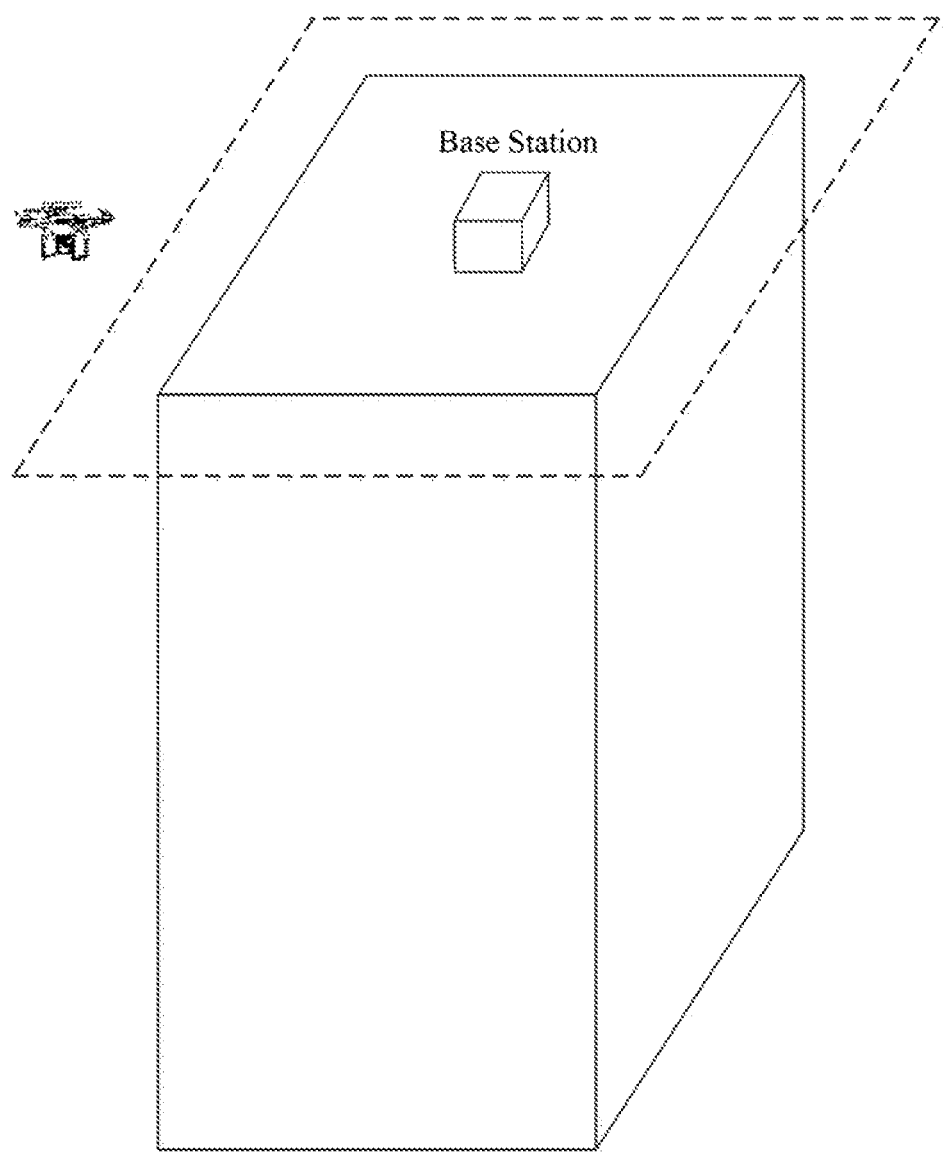
FIG. 3 is a schematic view showing the step of obtaining a total cleaning path in step 1 of the method for cleaning a wall body by a UAV as shown in FIG. 1.

Specifically, as shown in FIG. 3, after taking off from the base station on the top of the building, the UAV can recognize a vertical wall surface and thereby obtain the total cleaning path, with its own positioning sensor (e.g. GPS), in accordance with a pre-recorded flight track (as shown in an illustrated dashed line), and by means of an ultrasonic sensor, a camera and the direction of gravity of an accelerometer.

In another embodiment, the total cleaning path is obtained by a global positioning system provided on a building. For example, all the regions to be cleaned on the building are provided with global positioning systems; the total cleaning path can be obtained by the global positioning systems, and can be uploaded to said UAV by the global positioning systems.

In another embodiment, the total cleaning path may be obtained by a positioning sensor mounted on said UAV in combination with a global positioning system provided on the building.

The total cleaning path may be planned according to the actual environment of the building, for example, the total cleaning path may comprise at least one of a path along a wall body of a building in a vertical direction, or a path along the wall body of the building in a horizontal direction.

Figure 4A:
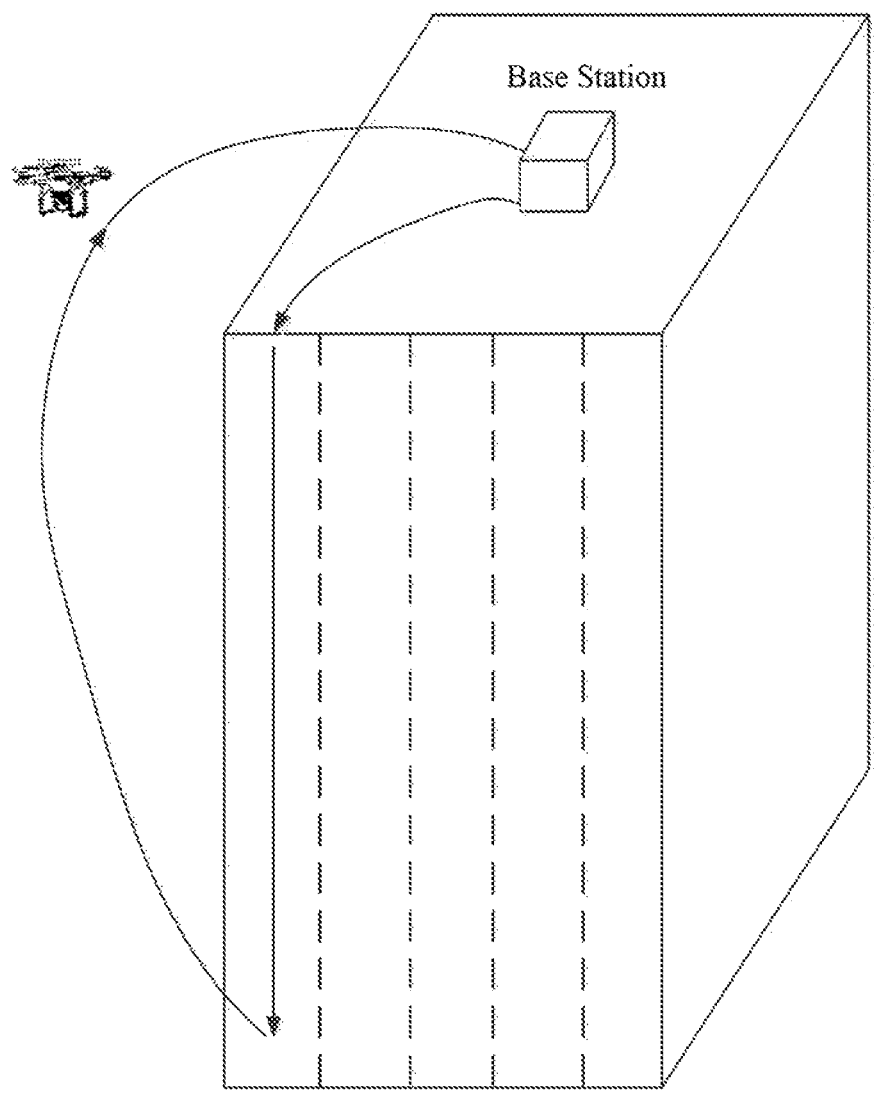
FIG. 4A is a schematic view of one embodiment of the total cleaning path in step 1 of the method for cleaning a wall body by a UAV as shown in FIG. 1.
Figure 4B:
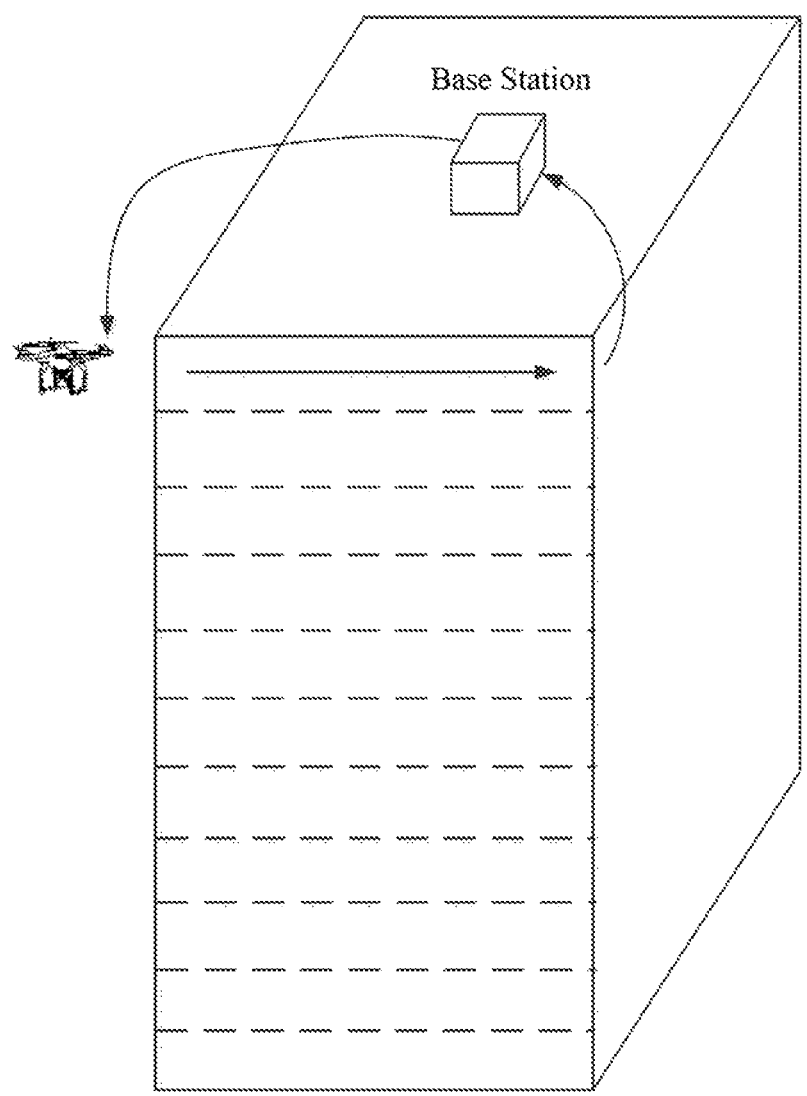
FIG. 4B is a schematic view of another embodiment of the total cleaning path in step 1 of the method for cleaning a wall body by a UAV as shown in FIG. 1.

Specifically, as shown in FIG. 4A, the path along a wall body of a building in a vertical direction may be a vertical path in a downward direction of the wall body of the building. As shown in FIG. 4B, the path along a wall body of a building in a horizontal direction may be a horizontal path from the left to the right of the wall body of the building.

Step 112 is planning the path to be cleaned according to the total cleaning path and the cleaned path.

The path to be cleaned can be updated in real time, for example, when cleaning a corner of said building, the UAV can timely select a cleaning path with the minimal energy required for returning, so as to save energy.

The path to be cleaned may also be updated at a pre-set time, for example, when the UAV returns to the base station, the updating of said region to be cleaned starts.

Step S12 is flying to a region to be cleaned according to the path to be cleaned.

Different approaches may be used to control the UAV to fly to the region to be cleaned according to different situations on the path to be cleaned. For example, when there are a few cleaning prohibition regions along the path to be cleaned, such as balconies, windows, etc. of a residential building, the UAV can be controlled to fly to the region to be cleaned by automatically recognizing the cleaning prohibition regions.

Figure 5:
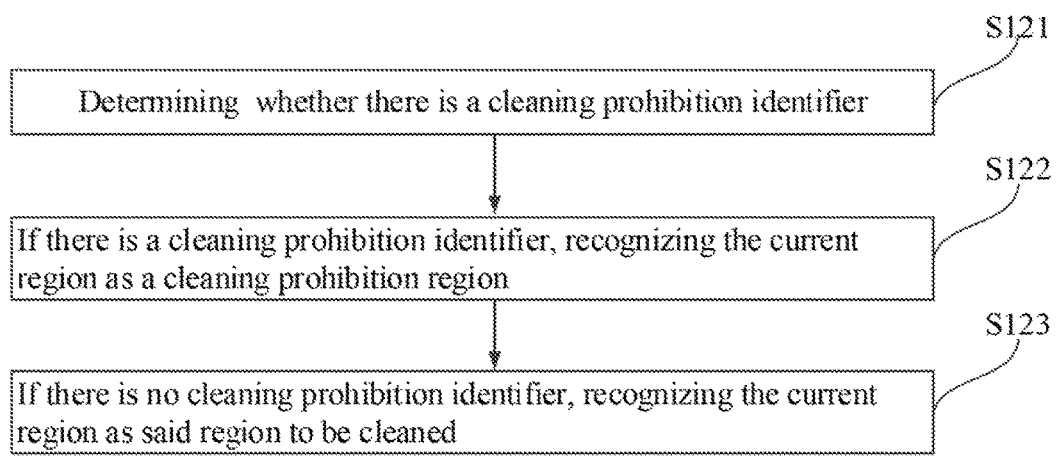
FIG. 5 is a specific flowchart of step 2 of the method for cleaning a wall body by a UAV as shown in FIG. 1.

For example, as shown in FIG. 5, specifically in this embodiment, when there are a few cleaning prohibition regions along the path to be cleaned, step S12 further comprises steps S121-S123.

Step S121 is determining whether there is a cleaning prohibition identifier.

The cleaning prohibition identifier may be designed according to the actual situation, for example, the cleaning prohibition identifier comprises at least one of a pattern provided on the wall surface, or a cleaning prohibition signal sent by a signal generator provided on the wall surface.

Said pattern may be provided in different ways, for example, in one embodiment, the pattern comprises a prohibition starting pattern and a prohibition ending pattern, which are located at two opposite edges of the cleaning prohibition region. The UAV stops the cleaning operation when it senses the prohibition starting pattern, and continues the cleaning operation when it senses the prohibition ending pattern, thereby avoiding the cleaning prohibition region.

Figure 6:
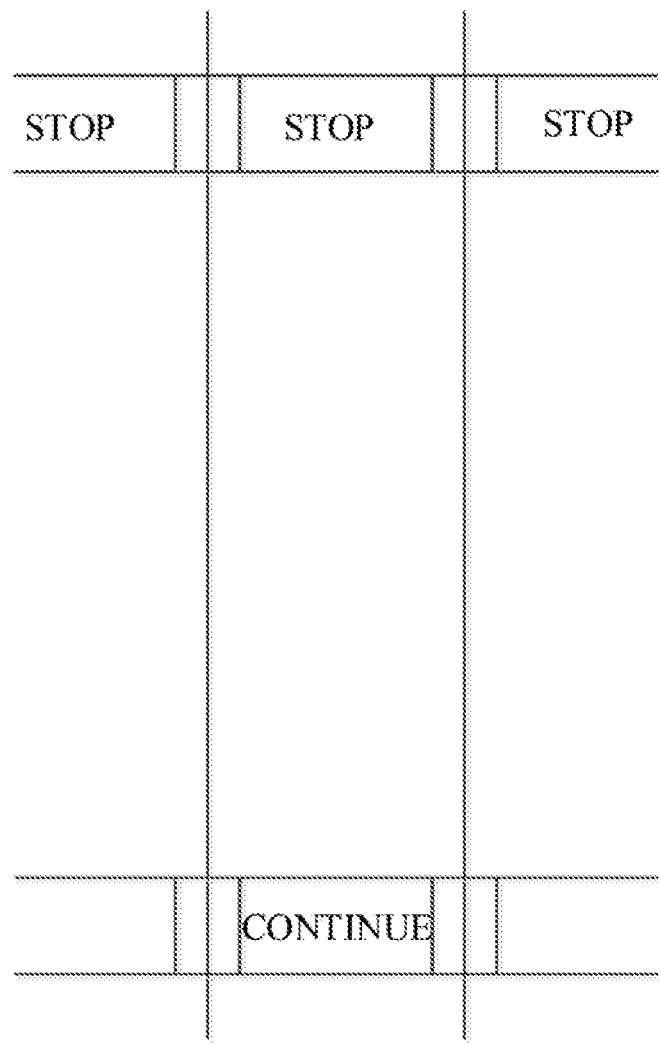
FIG. 6 is a schematic view of one embodiment of a cleaning prohibition identifier in step 2 of the method for cleaning a wall body by a UAV as shown in FIG. 1.

Specifically, as shown in FIG. 6, some outer walls do not need cleaning due to special reasons, then a prohibition starting pattern with a "Stop" sign and a prohibition ending pattern with a "Continue" sign can be adhered to the wall body where cleaning is not needed.

Said signal generator may be provided in different ways, for example, in one embodiment, there is a plurality of said signal generators, and the signal generators comprise a starting signal generator and an ending signal generator which are located at two opposite edges of the cleaning prohibition region. The UAV stops the cleaning operation when it senses the signal sent by the starting signal generator, and resumes the cleaning operation when it senses the signal sent by the ending signal generator, thereby avoiding the cleaning prohibition region.

In another embodiment, there is a plurality of signal generators, the plurality of signal generators is provided in the middle of the cleaning prohibition region, and signals generated by the plurality of signal generators cover the cleaning prohibition region. The UAV stops the cleaning operation when it senses the signal sent by the signal generator, and resumes the cleaning operation when the signal sent by the signal generator disappears, thereby avoiding the cleaning prohibition region.

Figure 7:
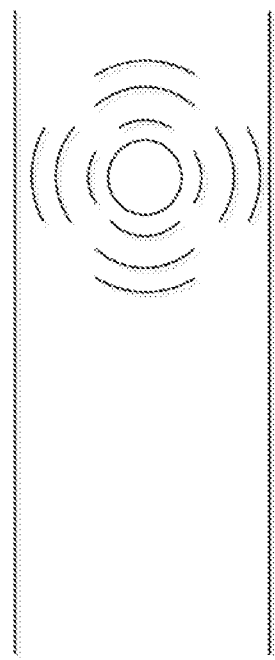
FIG. 7 is a schematic view of another embodiment of the cleaning prohibition identifier in step 2 of the method for cleaning a wall body by a UAV as shown in FIG. 1.

Specifically, as shown in FIG. 7, a short-distance signal generator is installed inside the building; when receiving a signal sent by the signal generator, the unmanned aerial vehicle stops cleaning operation until the signal sent by the signal generator disappears. The region covered by the signal sent by the signal generator is the cleaning prohibition region.

Step S122 is recognizing the current region as a cleaning prohibition region if there is a cleaning prohibition identifier.

When the UAV recognizes the current region as a cleaning prohibition region, the UAV stops the cleaning of the current region.

Step S123 is recognizing the current region as region to be cleaned if there is no cleaning prohibition identifier.

When the UAV recognizes the current region as the region to be cleaned, the UAV is allowed to clean the current region.

Step S13 is recognizing a wall surface of the region to be cleaned.

Step S13 may comprise steps of measuring the distance between the wall surface and the UAV and recognizing the type of wall surface.

The distance between the wall surface and the UAV can be obtained by a wall surface distance sensor of the UAV, for example, the wall surface distance sensor may be an ultrasonic distance sensor, a visual distance sensor, a laser distance sensor, an infrared distance sensor, a radar distance sensor and the like.

Step S14 is using a cleaning device carried by a UAV to clean the wall surface.

There may be various modes for cleaning the wall surface, for example, ultrasonic oscillation cleaning, detergent spraying cleaning and so on. When the ultrasonic oscillation cleaning mode is used, the cleaning device comprises an ultrasonic transducer for generating ultrasonic oscillation. When the detergent spraying cleaning mode is used, the cleaning device comprises a spraying mechanism for spraying a detergent.

The term "ultrasonic oscillation cleaning" refers to using an ultrasonic transducer to generate ultrasonic waves towards a wall surface, and using the ultrasonic waves to oscillate dust on the wall surface.

The area of the wall surface subjected to ultrasonic vibration can be controlled in different ways, for example, the area of the wall surface subjected to ultrasonic vibration is adjusted by the distance between the cleaning device and the wall surface. For example, when the ultrasonic waves generated by the ultrasonic transducer are emitted in a fan shape, the greater the distance between the ultrasonic transducer and the wall surface, the larger the area of the wall surface subjected to ultrasonic vibration, and vice versa.

In another embodiment, the area of the wall surface subjected to ultrasonic vibration is adjusted by the cleaning device itself. For example, when the size of an outlet for the ultrasonic waves from the ultrasonic transducer is adjustable, the larger the outlet for the ultrasonic waves, the larger the area of the wall surface subjected to ultrasonic vibration, and vice versa.

The term "detergent spraying cleaning" refers to spraying a detergent towards a wall surface, and then using a cleaning component to wipe off dirt on the wall surface.

The area of the wall surface subjected to detergent spraying can be controlled in different ways, for example, the area of the wall surface subjected to detergent spraying is adjusted by the distance between the cleaning device and the wall surface. For example, when the detergent sprayed by the spraying mechanism is in a fan shape, then the greater the distance between the cleaning device and the wall surface, the larger the area of the wall surface subjected to detergent spraying, and vice versa.

In another embodiment, the area of the wall surface subjected to detergent spraying is adjusted by the cleaning device itself. For example, when the size of a spraying port of the spraying mechanism is adjustable, then the larger the spraying port of the spraying mechanism, the larger the area of the wall surface subjected to detergent spraying, and vice versa.

The detergent spraying cleaning mode may be in various forms, for example, wiping by sliding back and forth, wiping by rotating, and wiping by one-way dragging.

The term "wiping by rotating" refers to driving a cleaning component to rotate around a driving shaft to make the cleaning component flap on a wall surface, so as to wipe off dirt on the wall surface.

The term "wiping by sliding back and forth" refers to driving a cleaning component to slide back and forth on a wall surface sprayed with a detergent, so as to wipe off dirt on the wall surface.

The term "wiping by one-way dragging" refers to dragging a cleaning component along a wall surface so that the cleaning component wipes off dirt on the wall surface.

Figure 8:
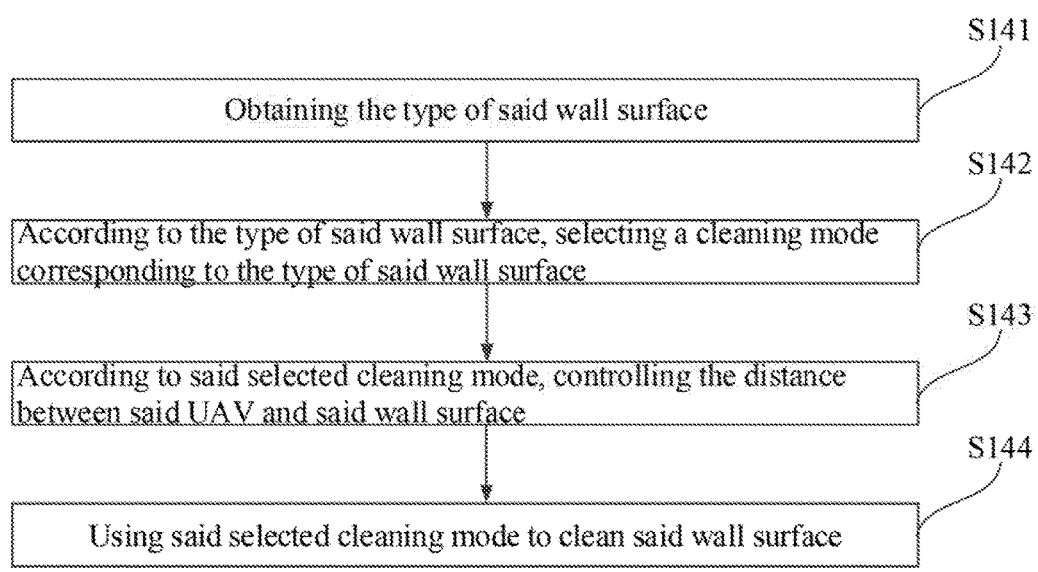
FIG. 8 is a specific flowchart of step 4 of the method for cleaning a wall body by a UAV shown in FIG. 1.

Step S14 can be obtained in different ways, for example, as shown in FIG. 8, in this embodiment, step S14 further comprises steps S141-S144.

Step S141 is obtaining the type of wall surface.

The type of wall surface can be obtained by a sensor of the UAV itself, or according to the information pre-set by a user.

Step S142 is selecting a cleaning mode corresponding to the type of wall surface in accordance therewith.

Different cleaning modes may be used for different types of wall surfaces. For example, for the dust collected on the wall surface, the ultrasonic oscillation mode can be used for cleaning; and for the dirt consolidated on the wall surface, the detergent spraying mode can be used for cleaning.

Step 143 is controlling the distance between the UAV and the wall surface according to the selected cleaning mode.

For the different cleaning modes, the distance between the UAV and the wall surface can be selectively controlled. For example, when the ultrasonic oscillation mode is used for cleaning, the distance between the UAV and the wall surface may be controlled at a first pre-set distance; and when the detergent spraying mode is used for cleaning, the distance between the UAV and the wall surface may be controlled at a second pre-set distance which is not equal to the first pre-set distance.

In addition, for the different cleaning areas, the distance between the UAV and the wall surface can also be selectively controlled, and the specific control modes are as described in Step S143, and will not be described in detail herein.

Step S144 is using the selected cleaning mode to clean the wall surface.

According to the selected cleaning mode, the wall surface can be cleaned once or many times repeatedly.

It should be noted that step S14 may also further comprise a step of recording a cleaned path while cleaning the wall surface, thereby updating the cleaned path in real time.

Furthermore, the method further comprises step S15: stopping the cleaning of said wall surface, and automatically returning to a landing point along a return path.

The return path may be a path pre-set by a user, for example, a path pre-set by the user according to the current environmental scenario. The return path may also be the cleaned path, i.e., returning along the flight path during cleaning. The return path may also be an automatically planned path, for example, the automatically planned path may be a path with the minimal energy consumption, a path with the shortest return travel, a path with the shortest return time and so on.

The landing point can be a site pre-set by a user, for example, the landing point is a base station for replenishing the UAV with energy and/or a cleaning raw material. Alternatively, the landing point may be a site automatically selected by the UAV.

Furthermore, the position of the base station can be set according to the position of the wall surface to be cleaned, for example, when the wall surface is an outer wall of a building, the base station may be provided in the air or on the top of the building. When the wall surface is an inner wall of a building, the base station may be provided on an indoor floor of the building.

The UAV stops the cleaning of said wall surface upon receiving at least one of information indicating that the currently remaining energy of the UAV is insufficient for returning, information indicating that the cleaning device is unable to continue working, or information indicating that the path to be cleaned has been finished by the UAV.

The information indicating that the cleaning device is unable to continue working comprises at least one of information indicating that the energy of the cleaning device is insufficient or information indicating that the cleaning raw material of the cleaning device is insufficient. The cleaning raw material of the cleaning device may be a detergent, water and the like.

The energy source of the UAV may be electrical energy or a fuel oil. In one embodiment, the energy sources of both the cleaning device and the UAV are electrical energy, and both of them share one power supply.

Figure 9:
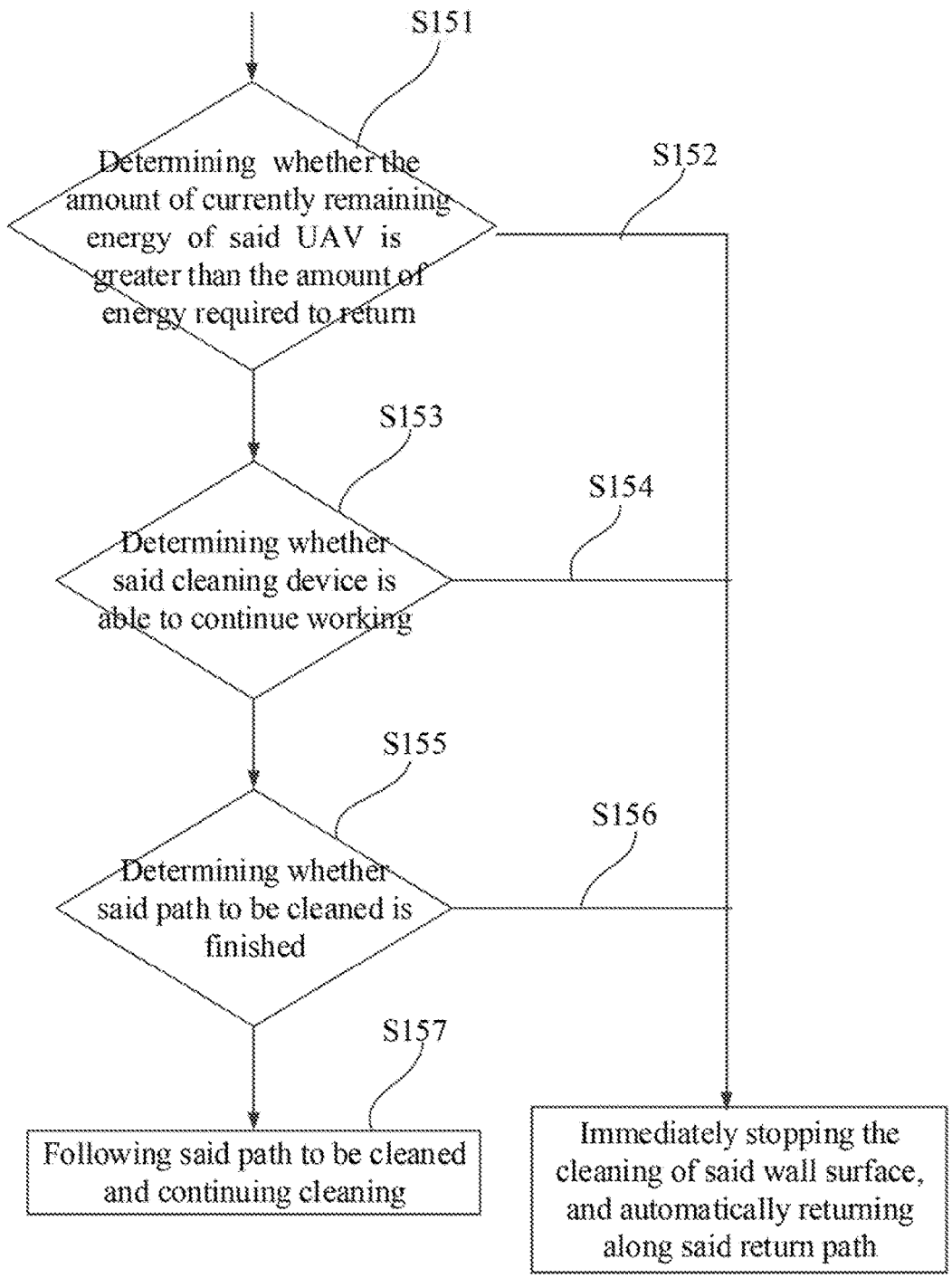
FIG. 9 is a specific flowchart of step 5 of the method for cleaning a wall body by a UAV shown in FIG. 1.

The specific implementation of step S15 can be designed according to different flight environments, for example, as shown in FIG. 9, specifically in this embodiment, step S15 further comprises the following step S151-S157.

Step S151 is determining whether the amount of currently remaining energy of said UAV is greater than the amount of energy required to return from the current position.

Specifically, in this embodiment, if the UAV is an electric UAV, then a judgement is made on whether the currently remaining electric power quantity of a battery of the UAV is greater than the electric power quantity required to return from the current position.

In another embodiment, if the UAV is a UAV using a fuel oil, then a judgement is made on whether the currently remaining fuel oil quantity in a fuel tank of the UAV is greater than the fuel oil quantity required to return from the current position.

Step S152 is immediately stopping the cleaning of said wall surface, and automatically returning along the return path, if the amount of currently remaining energy of said UAV is not greater than the amount of energy required to return from the current position.

Specifically, in this embodiment, if the currently remaining electric power quantity of the battery of the UAV is not greater than the electric power quantity required to return from the current position, the UAV immediately stops the cleaning of said wall surface, and automatically returns along the return path.

In another embodiment, if the currently remaining fuel oil quantity in the fuel tank of the UAV is not greater than the fuel oil quantity required to return from the current position, the UAV immediately stops the cleaning of said wall surface, and automatically returns along the return path.

Step S153 is determining whether the cleaning device is able to continue working, if the amount of currently remaining energy of the UAV is greater than the amount of energy required to return from the current position.

Specifically, in this embodiment, if the currently remaining electric power quantity of the battery of the UAV is greater than the electric power quantity required to return from the current position, then a judgement is made on whether the power and the cleaning raw material of the cleaning device are sufficient.

In another embodiment, if the currently remaining fuel oil quantity in the fuel tank of the UAV is greater than the fuel oil quantity required to return from the current position, then a judgement is made on whether the power and the cleaning raw material of the cleaning device are sufficient.

Step S154 is immediately stopping the cleaning of said wall surface and automatically returning along the return path, if the cleaning device is unable to continue working.

Specifically, in this embodiment, if the power or the cleaning raw material required by the cleaning device is insufficient, the UAV immediately stops the cleaning of said wall surface, and automatically returns along the return path.

Step S155 is determining whether the path to be cleaned is finished, if the cleaning device is able to continue working.

Specifically, in this embodiment, if the power and the cleaning raw material required by the cleaning device are sufficient, a judgement is made on whether the region to be cleaned is finished.

Step S156 is immediately stopping the cleaning of said wall surface, and automatically returning along the return path, if the path to be cleaned is finished.

Specifically, in this embodiment, the UAV determines whether the current position is located at the terminal position of the path to be cleaned, according to the path to be cleaned and the information about the current position. If the current position is located at the terminal position of the path to be cleaned, the UAV immediately stops the cleaning of said wall surface, and automatically returns along the return path.

Step S157 is the UAV following the path to be cleaned and continuing cleaning, if the path to be cleaned is not finished.

Specifically, in this embodiment, the current position is not located at the terminal position of the path to be cleaned, the UAV continues cleaning by following the path to be cleaned until it reaches the terminal position of the path to be cleaned.

It should be noted that, as shown in FIG. 1, if said landing point is a base station, said method further comprises step S16 after step S15: replenishing the UAV with energy and/or a cleaning raw material by the base station.

Specifically, in this embodiment, if the electric power quantity of the battery of the UAV is insufficient, the base station replaces the battery of the UAV and charges the replaced battery. If the detergent is insufficient, the base station replenishes the UAV with the detergent.

Compared to traditional wall body cleaning methods, the above-mentioned method for cleaning a wall body by a UAV has at least the following advantages:

(1) In the above-mentioned method, a cleaning device carried by the UAV is used to clean the wall surface, and thus there is no need for workers to operate at height, thereby greatly reducing the risk of danger in cleaning the wall body of a building.

(2) The UAV can freely hover in the air without the need of attachment to the wall surface of the building, which realizes more flexible movement, and is applicable to different types of wall bodies.

(3) The UAV can automatically search for a region to be cleaned according to a path to be cleaned and recognize the wall surface in the cleaning region, thereby greatly improving automation in cleaning the building wall surface.

Based on the above-mentioned methods for cleaning a wall body by a UAV, the present disclosure further provides a wall body cleaning system embodiment.

Figure 10:
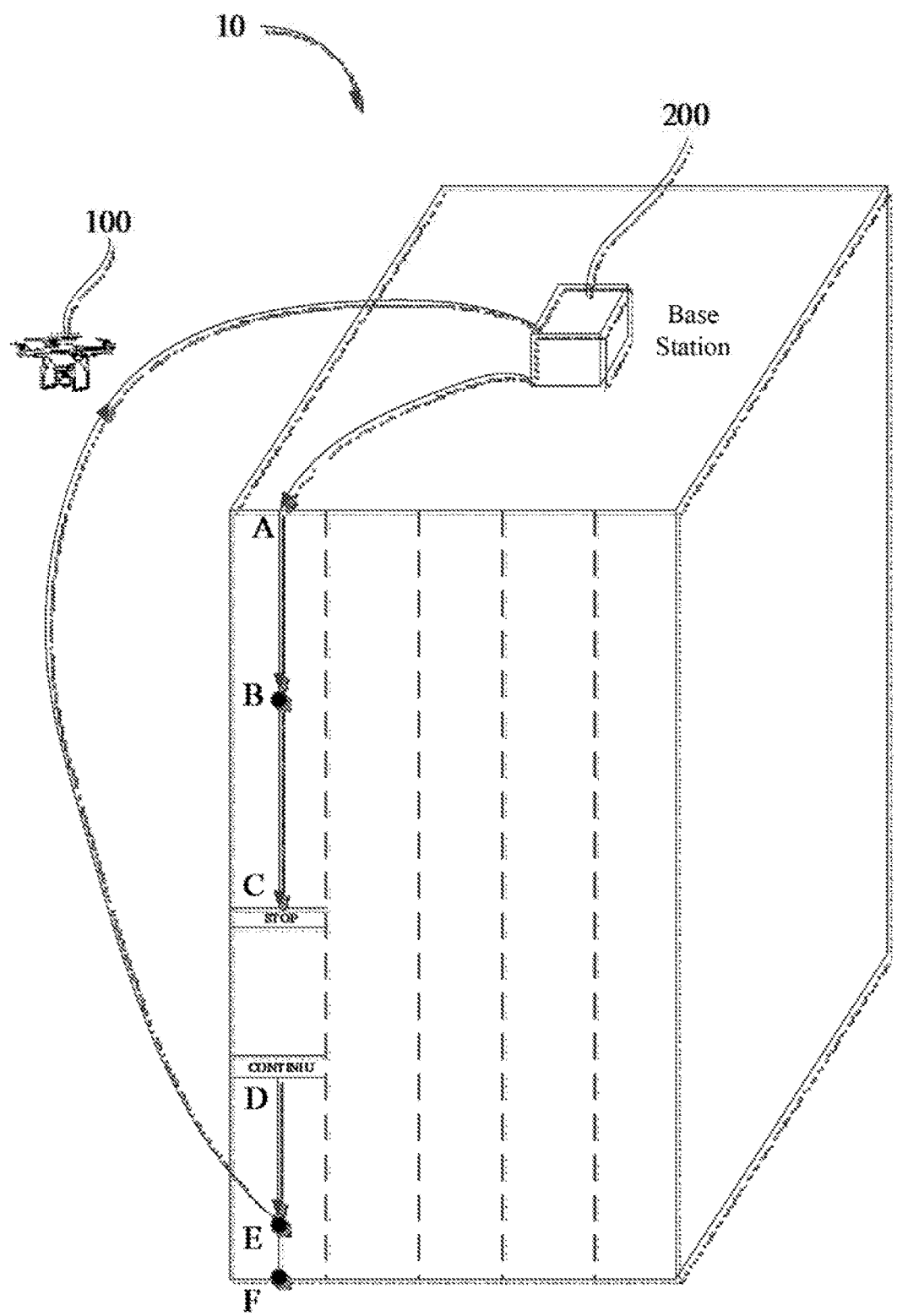
FIG. 10 is a structural schematic view of a wall body cleaning system according to an embodiment of the present disclosure.

With reference to FIG. 10, the wall body cleaning system 10 of this embodiment comprises a UAV 100 for cleaning a wall body, and a base station 200 for replenishing the UAV 100 with energy and/or a cleaning raw material.

Figure 11:
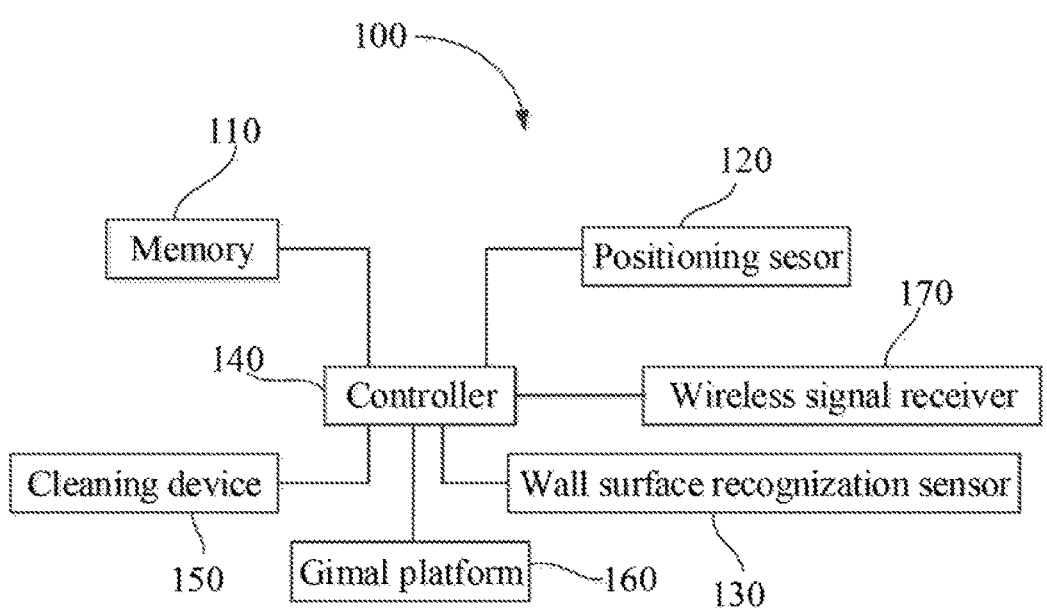
FIG. 11 is a circuit diagram of a UAV of the wall body cleaning system as shown in FIG. 10.

With reference to FIG. 11, specifically, in this embodiment, the UAV 100 comprises a memory 110, a positioning sensor 120, a wall surface recognition sensor 130, and a controller 140.

The memory 110 is used for storing a path to be cleaned. The memory 110 may be a storage device such as a hard disk or a flash card.

The positioning sensor 120 is used for obtaining information about the current position of the UAV 100. For example, the positioning sensor 120 comprises at least one of a GPS, an IMU (inertial measurement unit), or an altimeter/height sensor. The GPS is used for obtaining positional coordinates of the UAV 100 in a three-dimensional space. The IMU is used for obtaining three-axis attitude angles and acceleration of the UAV 100. The height sensor is used for obtaining the absolute altitude or relative height of the UAV 100. For example, said height sensor comprises at least one of a barometric altimeter, an infrared distance sensor, an ultrasonic distance sensor, a visual distance sensor, a laser distance sensor, or a radar distance sensor.

A wall surface recognition sensor 130 is used for obtaining information about a wall surface. For example, the wall surface recognition sensor 130 comprises at least one of a wall surface distance sensor, a wall surface type sensor, or a prohibition identifier recognition sensor.

The wall surface distance sensor is used for sensing the distance between the UAV 100 and the wall surface. For example, the wall surface distance sensor comprises at least one of an ultrasonic distance sensor, a visual distance sensor, a laser distance sensor, an infrared distance sensor, or a radar distance sensor.

The wall surface type sensor is used for recognizing the type of wall surface. For example, the wall surface type sensor comprises at least one of an ultrasonic sensor, a laser sensor, or a visual sensor.

Since one building may have different types of walls, the types of wall surfaces can be classified into a glass wall surface type and an ordinary wall surface type. The ordinary wall surfaces can be classified into a wall surface with distinguishable textures, a wall surface with a repeated texture, and a wall surface without texture. Different types of walls require different cleaning tasks (for example, using different washing agents, etc.), and there is a need to use a wall surface type sensor to recognize the type of wall surface.

For example, a glass wall has the characteristics of stable light reflection and ultrasonic wave reflection and so on; if a sweeping and yaw drift angle (<30°) of the UAV 100 is satisfied, then the numerical value of the distance sensed by an ultrasonic sensor is stable, a scene depth map obtained by a binocular camera is complex (the distant scenery being mirror-reflected by the glass) or the image of the UAV 100 itself can be recognized, and the glass wall surface can be recognized relatively reliably in combination with the pre-set information about the types of wall surface (for example, whether or not a glass wall surface is present) and statistics of continuous detection.

The ordinary wall surfaces can be classified into a wall surface with distinguishable textures, a wall surface with a repeated texture, and a wall surface without texture, wherein a wall surface plane can be modelled in the images of the wall surface with distinguishable textures obtained by the binocular camera; whereas the wall surface with a repeated texture and the wall surface without texture can be recognized in combination with ultrasonic information from the ultrasonic sensor.

A prohibition identifier recognition sensor is used for recognizing a washing prohibition identifier on the wall surface. For example, the prohibition identifier recognition sensor comprises at least one of a signal receiver, or a visual sensor.

A controller 140 is communicatively connected to the memory 110, the positioning sensor 120 and the wall surface recognition sensor 130, so as to obtain the path to be cleaned, the information about a wall surface, and the information about the current position. For example, the controller 140 may be a control chip, a control circuit board and so on.

The controller 140 sends a flight control signal for flying to a region to be cleaned according to the path to be cleaned and the information about the current position. The controller 140 sends a cleaning control signal for cleaning the wall surface according to the information about a wall surface.

Furthermore, the memory 110 further stores a total cleaning path and a cleaned path, and the controller 140 calculates the path to be cleaned according to the total cleaning path and the cleaned path.

The cleaned path can be recorded in real time as the UAV 100 starts the cleaning operation, and the path to be cleaned can be derived from the comparison of the cleaned path and the total cleaning path.

Furthermore, the total cleaning path can be obtained in different ways; in one embodiment, the total cleaning path can be obtained by a positioning sensor 120 of the UAV 100 itself, for example, the UAV 100 flies around the regions to be cleaned of the building before planning the total cleaning path, and obtains positional information about all the regions to be cleaned by the positioning sensor 120 of the UAV 100 itself, so as to obtain the total cleaning path.

In another embodiment, the total cleaning path is obtained by a global positioning system provided on a building. For example, all the regions to be cleaned on the building are provided with global positioning systems; the total cleaning path can be obtained by the global positioning systems, and can be uploaded to said UAV 100 by the global positioning systems.

In another embodiment, the total cleaning path is obtained by a positioning sensor 120 of said UAV 100 itself together with a global positioning system provided on the building.

The total cleaning path may be planned according to the actual environment of the building, for example, the total cleaning path may comprise at least one of a path along a wall body of a building in a vertical direction, or a path along the wall body of the building in a horizontal direction.

For example, the path along a wall body of a building in a vertical direction may be a vertical path in a downward direction of the wall body of the building, and the path along a wall body of a building in a horizontal direction may be a horizontal path from the left to the right of the wall body of the building.

Furthermore, the memory 110 is further used to store a return path, and the controller 140 controls the UAV 100 to return to the landing point according to the return path.

The return path may be a path pre-set by a user, for example, a path which is pre-set by the user and used for landing onto a base station 200. The return path may also be the cleaned path, i.e. backtracking along the cleaning path previously traveled. The return path may also be a path automatically planned by the UAV 100. For example, the automatically planned path comprises at least one of: a path with the minimal energy consumption, a path with the shortest return travel, and a path with the shortest return time.

Furthermore, the UAV 100 may also be integrated with a cleaning device 150 for cleaning the wall surface. Of course, in the present disclosure, the UAV 100 and the cleaning device 150 can also be separately designed.

With reference to FIGS. 13-16, the cleaning device 150 comprises at least one of: a spraying mechanism 191 for spraying a detergent, an ultrasonic transducer for generating ultrasonic oscillation, a sliding-driving mechanism 192 for driving a cleaning component 195 to slide back and forth, a rotation-driving mechanism 193 for driving the cleaning component 195 to rotate, and a dragging mechanism 194 for dragging the cleaning component 195.

Figure 13:
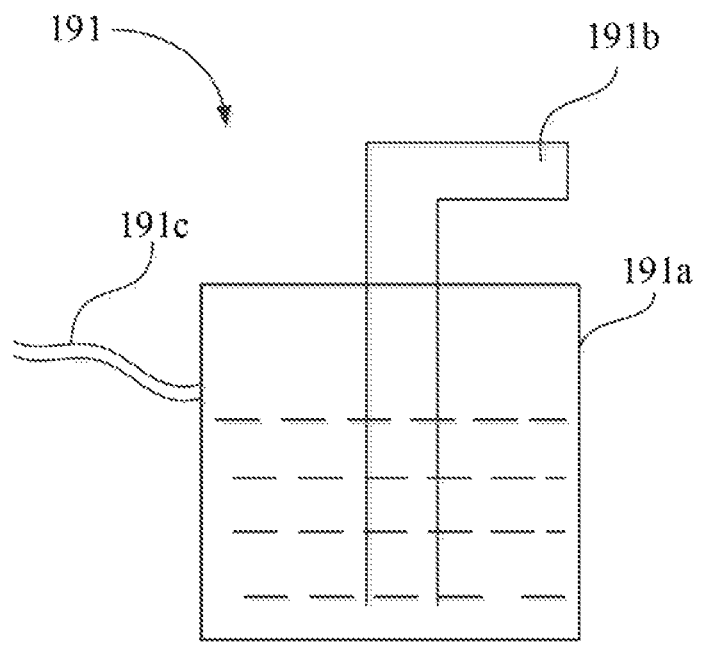
FIG. 13 is a structural schematic diagram of a spraying mechanism of a cleaning device of the UAV as shown in FIG. 11.

The specific structure of the spraying mechanism 191 may be different, for example, as shown in FIG. 13, the spraying mechanism 191 may comprise a container 191*a* for containing a detergent, a nozzle 191*b* for spraying the detergent, and a gas pipe 191*c* for introducing a gas pressure. The spraying mechanism 191 may also adopt an atomizing structure, which will not be described in detail herein.

The ultrasonic transducer may be of any structure, for example, may be an MEMS ultrasonic transducer, and the specific structure thereof will not be described in detail herein.

Figure 14:
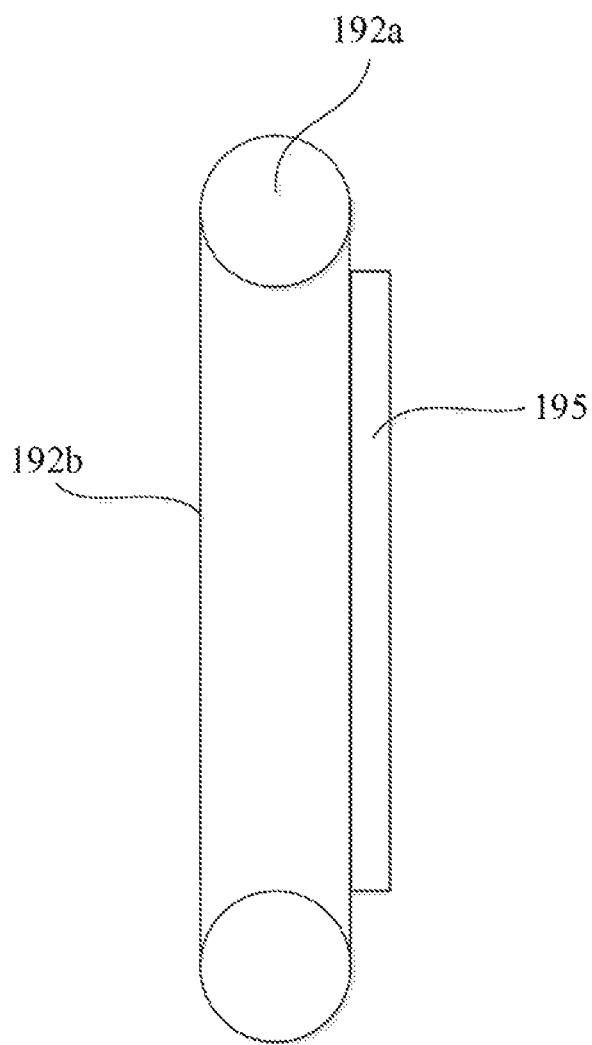
FIG. 14 is a structural schematic diagram of a sliding-driving mechanism of the cleaning device of the UAV as shown in FIG. 11.

The specific structure of the sliding-driving mechanism 192 can be designed according to actual requirements, for example, as shown in FIG. 14, a pulley 192*a* can be used to drive a belt 192*b* to rotate back and forth, and the cleaning component 195 can be fixed to the belt 192*b* and move back and forth along with the belt 192*b*.

Figure 15:
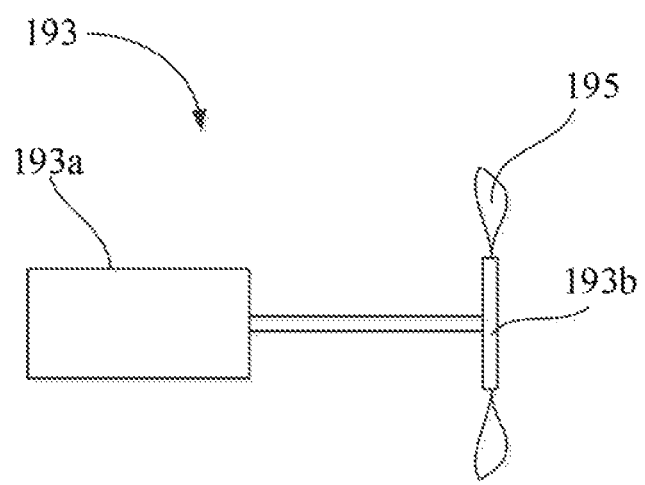
FIG. 15 is a structural schematic diagram of a rotation-driving mechanism of the cleaning device of the UAV as shown in FIG. 11.

The specific structure of the rotation-driving mechanism 193 can be designed according to actual requirements, for example, as shown in FIG. 15, a motor 193*a* can be used to drive a rotary disk 193*b* to rotate, and the cleaning component 195 can be fixed to the rotary disk 193*b* and rotate along with the rotary disk 193*b* or swing around an axis of the rotary disk 193*b*.

Figure 16:
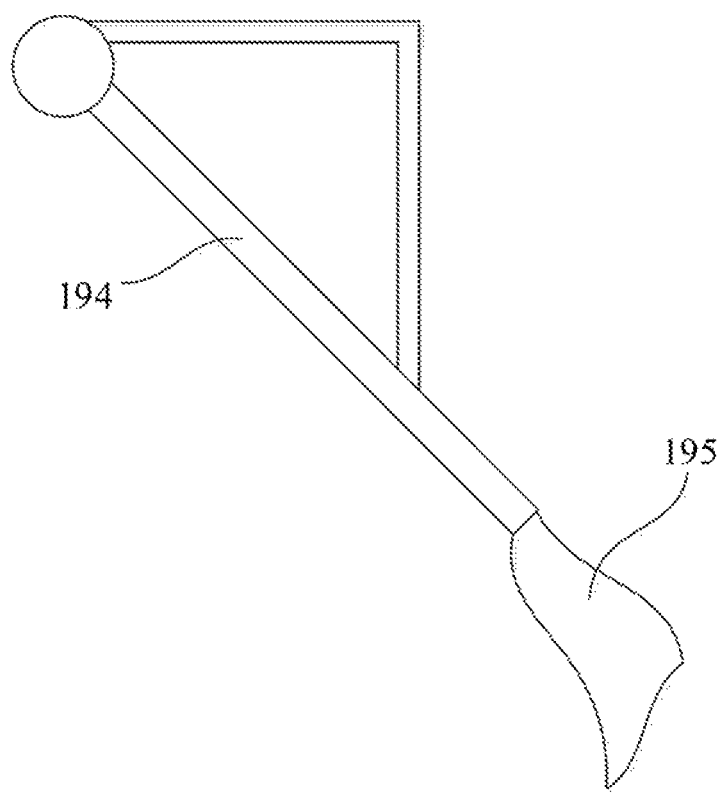
FIG. 16 is a structural schematic diagram of a dragging mechanism of the cleaning device of the UAV as shown in FIG. 1I.

The specific structure of the dragging mechanism 194 can be designed according to actual requirements, for example, as shown in FIG. 16, the dragging mechanism 194 can be a dragging bracket connected to a body of the UAV 100, and the cleaning component 195 is fixed to the dragging bracket and moves along with the dragging bracket. The dragging bracket can adjust the angle of inclination thereof relative to the wall surface.

The cleaning component 195 may be a common wiping component, for example, a cleaning cloth and a cleaning sponge.

The area cleaned in a single pass by the cleaning device 150 can be adjusted according to the distance between the cleaning device 150 and the wall surface. When an ultrasonic transducer is used for generating ultrasonic oscillation, the area of the wall surface subjected to ultrasonic oscillation is adjusted by the distance between the ultrasonic transducer and said wall surface. For example, when the ultrasonic waves generated by the ultrasonic transducer are emitted in a fan shape, the greater the distance between the ultrasonic transducer and the wall surface, the larger the area of the wall surface subjected to ultrasonic vibration, and vice versa.

When a spraying mechanism 191 is used for spraying a detergent, the area of said wall surface subjected to detergent spraying is adjusted by the distance between the spraying mechanism 191 and the wall surface. For example, when the detergent sprayed by the spraying mechanism 191 is in a fan shape, then the greater the distance between the cleaning device 150 and the wall surface, the larger the area of the wall surface subjected to detergent spraying, and vice versa.

In another embodiment, the area of the wall surface subjected to ultrasonic vibration is adjusted by the ultrasonic transducer itself. For example, when the size of an outlet for the ultrasonic waves from the ultrasonic transducer is adjustable, the larger the outlet for the ultrasonic waves, the larger the area of the wall surface subjected to ultrasonic vibration, and vice versa.

The area of said wall surface subjected to detergent spraying is adjusted by the spraying mechanism 191 itself. For example, when the size of a spraying port of the spraying mechanism 191 is adjustable, then the larger the spraying port of the spraying mechanism 191, the larger the area of the wall surface subjected to detergent spraying, and vice versa.

Figure 17:
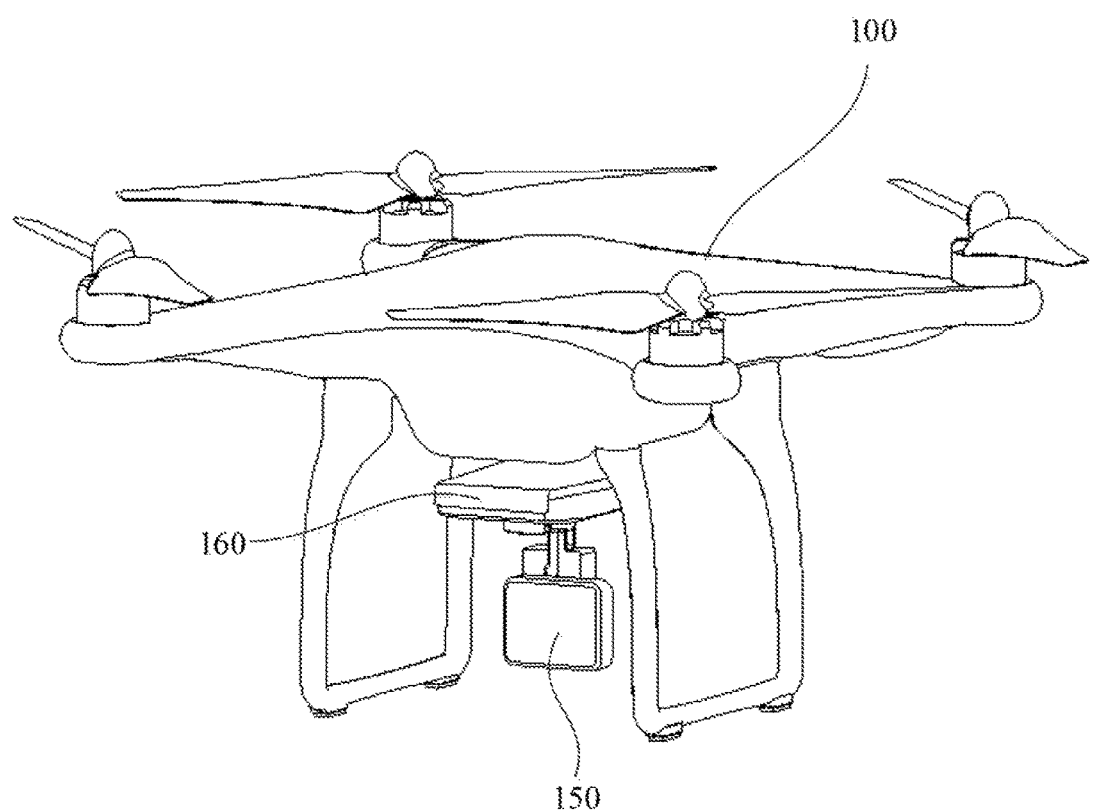
FIG. 17 is a structural schematic view of the UAV as shown in FIG. 11.

Furthermore, as shown in FIG. 17, UAV 100 further comprises a gimbal platform 160, the cleaning device 150 is connected to the body of the UAV 100 via the gimbal platform 160, and the attitude of the cleaning device 150 is adjusted by the gimbal platform 160.

It should be noted that the gimbal platform 160 may also be omitted, in which case, the cleaning device 150 may be directly fixedly connected to the body of the UAV 100, and the attitude of the cleaning device 150 may be adjusted via the attitude of the UAV 100.

Figure 12:
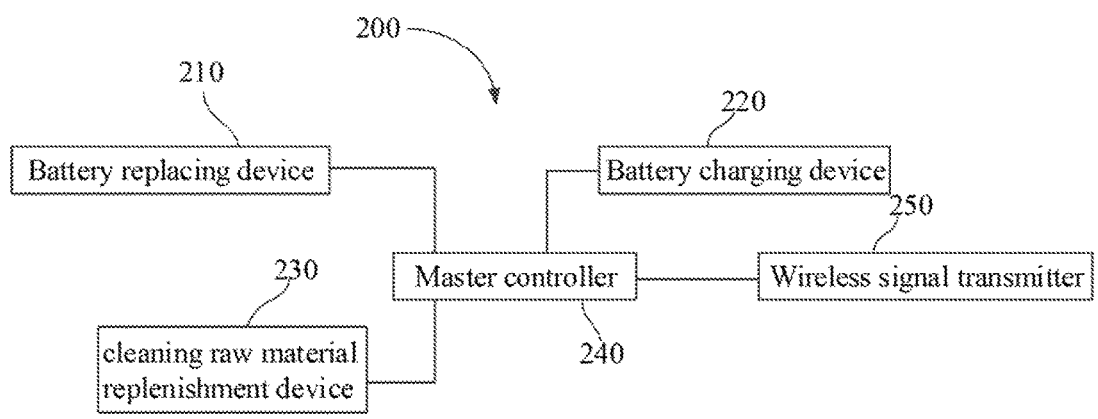
FIG. 12 is a circuit diagram of a base station of the wall body cleaning system as shown in FIG. 10.

The specific structure of the base station 200 can be designed according to various requirements, for example, as shown in FIG. 12, in this embodiment, the energy source of the UAV 100 is electrical energy, and the base station 200 comprises a battery replacing device 210 for replacing a battery of the UAV 100 and a battery charging device 220 for charging the battery of the UAV 100.

In other embodiments, the energy source of the UAV 100 is a fuel oil, and the base station 200 comprises a fuel oil replenishment device for replenishing the UAV 100 with fuel oil.

Furthermore, the base station 200 further comprises a cleaning raw material replenishment device 230 for replenishing the UAV 100 with the cleaning raw material.

The position of the base station 200 can be set according to the position of the wall surface to be cleaned. For example, in one embodiment, the wall surface is an outer wall of a building, and the base station 200 is provided in the air or on the top of the building.

In another embodiment, the wall surface is an inner wall of a building, and the base station 200 is provided on an indoor floor of the building.

The method of matching the UAV 100 with the base station 200 can be designed differently according to the number of UAVs 100, or the number of base stations 200. For example, in one embodiment, there is a plurality of UAVs 100, and the base station 200 is able to simultaneously or sequentially replenish the plurality of UAVs 100 with energy and the cleaning raw material. That is to say, a plurality of UAVs 100 can share one base station 200 for replenishment; the base station 200 can sequentially replenish the plurality of UAVs 100, or the base station 200 can simultaneously replenish the plurality of UAVs 100.

In another embodiment, there is a plurality of base stations 200, and the UAV 100 is able to automatically select one of the base stations 200 for the replenishment of energy and the cleaning raw material. For example, the plurality of base stations 200 can be respectively arranged in different positions, and the UAV 100 can select the base station 200, to which the return travel is the shortest, for replenishment.

In another embodiment, there is a plurality of UAVs 100 and a plurality of base stations 200; the replenishment can be carried out by combining both of the above-mentioned methods, and the specific coordinating methods are as stated above, and will not be described in detail herein.

Furthermore, as shown in FIG. 12, for facilitating the control of the UAV 100, particularly simultaneous control of a plurality of UAVs 100, the base station 200 further comprises a master controller 240 for controlling the UAVs 100 and a wireless signal transmitter 250 for transmitting a control signal, and said UAV 100 further comprises a wireless signal receiver 170. For example, when all the UAVs 100 need to be called back to the base station 200 at the same time, the user can input a control command to said master controller 240, and said master controller 240 sends control signals to all the UAVs 100 via the wireless signal transmitter 250, thereby simultaneously controlling all the UAVs 100 to return to the base station 200, that is to say, it is possible to achieve the function of simultaneously calling back all the UAVs 100.

Furthermore, the master controller 240 may be further used for controlling the battery replacing device 210, the battery charging device 220, and the cleaning raw material replenishment device 230.

The above-mentioned wall body cleaning system 10 will be specifically explained below in conjunction with FIG. 10.

Firstly, a UAV 100 obtains a total cleaning path AF and a cleaned path AB, so as to obtain a path to be cleaned BF.

Next, the UAV 100 flies to point B according to the path to be cleaned BF, a wall surface recognition sensor 130 of the UAV 100 recognizes the type of wall surface, a corresponding cleaning mode is selected according to the type of wall surface, the distance between the UAV 100 and the wall surface is controlled, and the cleaning of the wall surface starts.

Next, when the UAV 100 cleans to point C, the wall surface recognition sensor 130 of the UAV 100 recognizes a cleaning prohibition signal, and the cleaning operation is stopped until the UAV 100 flies to point D, i.e. the segment CD is a cleaning operation prohibition region.

Then, the UAV 100 continues the cleaning operation from point D until point E where the battery of the UAV 100 has an insufficient electric power quantity.

Finally, the UAV 100 automatically returns along the return path from point E to the base station 200 for replenishment.

The above-mentioned wall body cleaning system has at least the following advantages:

(1) The above-mentioned wall body cleaning system 10 uses a cleaning device 150 carried by a UAV 100 to clean the wall surface, and thus there is no need for workers to operate at height, thereby greatly reducing the risk of danger in cleaning the wall body of a building.

(2) The UAV 100 can freely hover in the air without the need of attachment to the wall surface of the building, which realizes more flexible movement, and is applicable to different types of wall bodies.

(3) The UAV 100 can automatically search for a region to be cleaned according to its own positioning sensor 120 and a path to be cleaned stored in a memory 110, and recognize the wall surface in the cleaning region according to its own wall surface recognition sensor 130, thereby greatly improving automation in cleaning the building wall surface.

In view of the embodiments provided in the present disclosure, it should be understood that the related apparatus and methods disclosed can be achieved in other ways. The device embodiments described above are merely illustrative. For example, the division of the modules or units stated is merely a logical function division. In fact, there may be other ways of division in practical implementation. Further, a plurality of units or components may be combined or may be integrated into another system, or some features may be omitted, or not implemented. On the other hand, the mutual coupling or direct coupling or communicative connection shown or discussed above may be indirect coupling or communicative connection via some interfaces, devices, or units, and may be electrical, mechanical, or in another form.

Units stated above which are described as separate components may be or may not be physically separate, and a component shown as a unit may be or may not be a physical unit, i.e., they may be located in one place, or may also be distributed to a plurality of network elements. Some or all of the units can be selected according to actual requirements to achieve the goals of the solutions of the embodiments.

In addition, various functional units in various embodiments of the present disclosure can be integrated into a processing unit or present as physically separate units, and it is also possible for two or more units to be integrated into one unit. The above-mentioned integrated unit can be implemented not only in the form of hardware but also in the form of a functional software unit.

If the integrated unit as described above is implemented in the form of a functional software unit and is sold or used as a standalone product, it can be stored in a computer readable storage medium. Based on this understanding, the part of the technical solutions of the present disclosure which substantially contributes to the present disclosure over the prior art or all or part of the technical solutions may be embodied in a form of a computer software product, and the computer software product may be stored in a storage medium comprising various instructions for causing a computer processor to perform all or some of the steps of the method embodiments of the present disclosure. The aforementioned storage medium comprises: a USB disk, a removable hard disk, a read-only memory (ROM), a random access memory (RAM), a magnetic or optical disk and various other media which can store program codes.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A method for cleaning a wall body by an Unmanned Aerial Vehicle (UAV), comprising:
   obtaining a path to be cleaned;
   flying said UAV to a current region according to said path to be cleaned;
   determining whether there is a cleaning prohibition identifier associated with the current region, the cleaning prohibition identifier identifying regions that do not need to be cleaned; and
   recognizing the current region based on whether there is the cleaning prohibition identifier, including:
     if there is a cleaning prohibition identifier:
       recognizing the current region as a cleaning prohibition region; and
       controlling said UAV to fly over the cleaning prohibition region without cleaning the cleaning prohibition region; and
     if there is no cleaning prohibition identifier:
       recognizing the current region as a region to be cleaned;
       recognizing a wall surface of said region to be cleaned; and
       using a cleaning device carried by said UAV to clean said wall surface.

2. The method according to claim 1, wherein said obtaining further comprises:
   obtaining a total cleaning path and a cleaned path; and
   planning the path to be cleaned according to said total cleaning path and said cleaned path.

3. The method according to claim 1, wherein said using further comprises:
   obtaining a type of said wall surface;
   selecting a cleaning mode corresponding to the type of said wall surface according to the type of said wall surface;
   controlling a distance between said UAV and said wall surface according to said selected cleaning mode; and
   using said selected cleaning mode to clean said wall surface.

4. The method according to claim 1, further comprising stopping cleaning of said wall surface, and automatically returning to a landing point along a return path.

5. The method according to claim 4, further comprising:
   determining whether an amount of currently remaining energy of said UAV is greater than an amount of energy required to return from a current position; and
   if the amount of currently remaining energy of said UAV is not greater than the amount of energy required to return from the current position, immediately stopping the cleaning of said wall surface, and automatically returning along said return path.

6. The method according to claim 4, wherein said landing point is a site pre-set by a user, or a site automatically set by said UAV.

7. The method according to claim 1, wherein said using step further comprises cleaning said wall surface by means of ultrasonic vibration.

8. The method according to claim 1, wherein said recognizing the wall surface of said region to be cleaned further comprises recording a cleaned path while cleaning said wall surface.

9. The method according to claim 1, wherein said using further comprises cleaning said wall surface by means of detergent spraying cleaning.

10. The method of claim 1, wherein the cleaning prohibition identifier includes at least one of a pattern provided on said wall surface or a signal generator provided on or behind said wall surface.

11. An Unmanned Aerial Vehicle (UAV), comprising:
    a memory for storing a path to be cleaned;
    a positioning sensor for obtaining information about a current position of the UAV;

a wall surface recognition sensor for obtaining information about a wall surface; and a controller communicatively connected to said memory, said positioning sensor and said wall surface recognition sensor, for obtaining said path to be cleaned, said information about said wall surface, and said information about the current position;

wherein said controller is configured to:
  send a flying control signal for flying to a current region according to said path to be cleaned and said information about the current position,
  determine whether there is a cleaning prohibition identifier associated with the current region, the cleaning prohibition identifier identifying regions that do not need to be cleaned; and
  recognize the current region based on whether there is the cleaning prohibition identifier, including:
    if there is a cleaning prohibition identifier:
      recognizing the current region as a cleaning prohibition region; and
      controlling said UAV to fly over the cleaning prohibition region without cleaning the cleaning prohibition region; and
    if there is no cleaning prohibition identifier:
      recognizing the current region as a region to be cleaned; and
      sending a cleaning control signal for cleaning said wall surface according to said information about said wall surface.

12. The UAV according to claim 11, wherein said positioning sensor comprises at least one of a GPS, an IMU, or a height sensor;

and said height sensor comprises at least one of a barometric altimeter, an infrared distance sensor, an ultrasonic distance sensor, a visual distance sensor, a laser distance sensor, or a radar distance sensor.

13. The UAV according to claim 11, wherein said wall surface recognition sensor comprises a wall surface distance sensor for measuring a distance between said UAV and said wall surface.

14. The UAV according to claim 11, wherein said wall surface recognition sensor comprises a wall surface type sensor for recognizing a type of said wall surface.

15. The UAV according to claim 11, wherein said wall surface type sensor comprises a prohibition identifier recognition sensor for recognizing the cleaning prohibition identifier on said wall surface.

16. The UAV according to claim 11, wherein said memory further stores a total cleaning path and a cleaned path, and said controller is further configured to obtain said path to be cleaned according to said total cleaning path and said cleaned path.

17. The UAV according to claim 11, wherein said memory is further used for storing a return path, and said controller is further configured to control said UAV to return to a landing point according to said return path.

18. The UAV according to claim 11, wherein said UAV further comprises a cleaning device for cleaning said wall surface.

19. The UAV according to claim 18, wherein said cleaning device comprises at least one of a sprayer for spraying a detergent, an ultrasonic transducer for generating ultrasonic oscillation, a rotation-driving mechanism connecting a cleaning component to the UAV, a sliding-driving mechanism connecting said cleaning component to the UAV, or a dragging mechanism connecting said cleaning component to the UAV.

20. The UAV according to claim 18, wherein said UAV further comprises a gimbal platform, said cleaning device is connected to a body of said UAV via said gimbal platform, and an attitude of said cleaning device is adjusted via said gimbal platform.

* * * * *